United States Patent
Meyer et al.

(10) Patent No.: US 8,886,678 B2
(45) Date of Patent: Nov. 11, 2014

(54) METHOD AND DEVICE FOR CONSTRUCTING AN ARBORESCENCE OF CLUSTERS OF ELECTRONIC DOCUMENTS

(75) Inventors: Franck Meyer, Lannion (FR); Jérôme Besombes, Paris (FR); Fabrice Clerot, Plestin les Greves (FR)

(73) Assignee: France Telecom, Paris (FR)

( * ) Notice: Subject to any disclaimer, the term of this patent is extended or adjusted under 35 U.S.C. 154(b) by 352 days.

(21) Appl. No.: 12/087,506

(22) PCT Filed: Dec. 20, 2006

(86) PCT No.: PCT/FR2006/051402
§ 371 (c)(1),
(2), (4) Date: Jul. 3, 2008

(87) PCT Pub. No.: WO2007/077378
PCT Pub. Date: Jul. 12, 2007

(65) Prior Publication Data
US 2009/0037458 A1 Feb. 5, 2009

(30) Foreign Application Priority Data
Jan. 3, 2006 (FR) .................................. 06 50024

(51) Int. Cl.
*G06F 17/30* (2006.01)
*G06Q 10/00* (2012.01)

(52) U.S. Cl.
CPC .................. *G06Q 10/00* (2013.01); *G06F 17/30327* (2013.01)
USPC ........................................................ 707/797

(58) Field of Classification Search
CPC .............................................. G06F 17/30327
USPC ........................................................ 707/797
See application file for complete search history.

(56) References Cited

U.S. PATENT DOCUMENTS

| 2006/0004561 | A1* | 1/2006 | Zhang et al. ....................... 704/4 |
| 2006/0136478 | A1* | 6/2006 | Berkner .......................... 707/102 |
| 2007/0239745 | A1* | 10/2007 | Guerraz et al. ................. 707/101 |

FOREIGN PATENT DOCUMENTS

| CA | 1034855 | 7/1978 |
| FR | 2 297 144 | 8/1876 |

(Continued)

OTHER PUBLICATIONS

Shi Zhong, Semi-Supervised Model-based Document Clustering: A Comparative Study, 2004, p. 22.*
Davisdon, Ian, "Clustering With Constraints: Feasibility Issues and the k-Means Algorithm", Apr. 2005 http://www.siam.org/proceedings/datamining/2005/dm05_13davidsoni.pdf.*
A. Goni et al., "Real-Time Classification of ECGs on a PDA", IEEE Transactions on Information Technology in Biomedicine, IEEE Service Center, vol. 9, No. 1, pp. 23-34, Mar. 2005.

(Continued)

*Primary Examiner* — Hosain Alam
*Assistant Examiner* — Johnese Johnson
(74) *Attorney, Agent, or Firm* — Cozen O'Connor

(57) ABSTRACT

A method of assisting with the construction of a tree of clusters of electronic documents, the documents being defined by predetermined attributes. The method includes, for a given cluster of documents and a given level of the tree, the following steps: a) obtaining (E300) constraints defined between at least two documents of said cluster and storing those constraints; b) constructing (E310) subclusters as a function of the constraints obtained and the attributes of the documents of said cluster; c) creating (E320) a tree level corresponding to the subclusters created; and d) selecting (E340) a created subcluster and iterating the steps a), b), c) and d) for the selected subcluster until said tree is obtained. A device for implementing the method is also disclosed.

14 Claims, 9 Drawing Sheets

(56) References Cited

FOREIGN PATENT DOCUMENTS

| FR | 2 851 353 | 8/2004 |
|---|---|---|
| GB | 21272 | 4/1913 |
| WO | WO 2007/137858 | 12/2007 |

OTHER PUBLICATIONS

Xing, Eric P. et al., "Distance metric learning, with application to clustering with side-information" (NIPS 15,2003) (8 pages).
Wagstaff, Kiri et al., "Constrained K-means Clustering with Background Knowledge" (ICML 2001) (8 pages).

* cited by examiner

METHOD AND DEVICE FOR CONSTRUCTING AN ARBORESCENCE OF CLUSTERS OF ELECTRONIC DOCUMENTS

RELATED APPLICATIONS

This is a U.S. national stage under 35 USC 371 of application No. PCT/FR2006/051402, filed on Dec. 20, 2006.

This application claims the priority of French patent application no. 06/50024 filed Jan. 3, 2006, the content of which is hereby incorporated by reference.

FIELD OF THE INVENTION

The invention relates to a method and a device for assisting with constructing a tree of clusters of electronic documents.

BACKGROUND OF THE INVENTION

The number of electronic documents (emails, images, web pages, texts, etc.) that a user has to manage is often large and is constantly growing. One well-known method of constructing a tree of clusters of documents is the entirely manual method. A user who has a number of documents to classify creates a tree made up of directories into which the documents are inserted as and when required. This method has the advantages of conforming to the wishes of the user and of facilitating manual modification of the tree. It can nevertheless become very tedious if there are many documents to be listed. Other methods offer totally automatic classification of electronic documents, whereby documents are defined by attributes (for example the name, type, and size of a file, word counts for text documents, colorimetry measurements for images, etc.). The attributes for each document form a vector describing the document. It is then possible to define a distance between two vectors, and thus a metric for the proximity of the documents. Taking account of the distances between documents, these classification methods construct clusters that can be structured in tree form (for example the "Ascendant Hierarchical Classification" method) or in some other form (for example the "k-means" method). The drawback of such automatic classification methods is that they do not always correspond to the organization required by the user. No correction is possible and the user is obliged either to accept the clusters obtained or to start the whole process again with different initial parameters (for example the required number of clusters) to obtain a different result.

Automatic "supervised" or "semi-supervised" learning methods take into consideration criteria fixed a priori by users to implement a learning mechanism. In supervised classification, users must apply labels to some of the documents that they wish to cluster. Two documents having the same label must be in the same cluster, and vice versa. A supervised learning algorithm constructs a model that gives each unlabelled document an appropriate label, as a function of its description. A supervised method assumes that users know all possible labels for documents to be classified and therefore know the final organization cluster. Users rarely have this a priori knowledge of the classification structure for their data. The initial knowledge necessary for using such algorithms greatly restricts their use for managing documents.

An example of a semi-supervised method in which users specify objects as being similar or different is described in the document "Distance metric learning, with application to clustering with side-information", Eric P. Xing, Andrew Y. Ng, Michael I. Jordan, and Stuart Russell (NIPS 15,2003). From this information, the system determines a metric (a weighting of the descriptive attributes of documents that favors certain attributes and penalizes others), which gives a new metric for the distances between documents to be adopted for the classification.

Another example of semi-supervised classification is proposed in the document "Constrainted k-means clustering with background knowledge", Kiri Wagstaff, Claire Cardie, Seth Rogers, and Stefan Schroedl (ICML 2001). This method assigns constraints to pairs of documents to specify that they belong to the same cluster or that they do not belong to the same cluster. The prior art k-means method is then used to cluster the documents, attempting to conform as closely as possible to pre-assigned constraints in terms of belonging to clusters. That method works only for non-hierarchical classifications. Moreover, it offers no solution for modifying, deleting or moving documents in the classification obtained and is liable to fail if it proves impossible to comply with the set constraints (under such circumstances, no classification is effected).

SUMMARY OF THE INVENTION

An object of the invention is to alleviate those drawbacks by proposing a method of assisting with the construction of a tree of a cluster of documents, which method classifies documents in a hierarchical manner that can easily be modified.

This and other objects are attained in accordance with one aspect of the present invention directed to a method of assisting users to construct a document cluster tree with minimum interaction and interaction that is as simple as possible.

Users are involved only at an intuitive level, needing no in-depth knowledge of data processing.

Users need not know a priori the final structure and the distribution of the documents in that structure, and the method of the invention enables users to modify their classification preferences.

The present invention provides a method that is simple to use and user friendly.

Such a method of assisting with the construction of a tree of clusters of electronic documents, which documents are defined by predetermined attributes, includes, for a given cluster of documents and a given level of the tree, the following steps:

a) obtaining and storing constraints defined between at least two documents of said cluster;

b) constructing subclusters as a function of the constraints obtained and the attributes of the documents of said cluster;

c) creating a tree level corresponding to the subclusters constructed; and d) selecting a constructed subcluster and iterating steps a), b), c), and d) for the selected subcluster until said tree is obtained.

Thus the method constructs a tree taking account at each level of the tree of defined constraints for each cluster of documents. Construction is therefore not restricted to an a priori definition, and can evolve as the tree is constructed or be started again for a portion of the tree should modification prove necessary.

In a preferred implementation, the subcluster construction step includes the following steps:

creating a cluster for each document participating in at least one constraint;

associating documents not participating in any constraint with the clusters created in this way according to a criterion calculated on the basis both of the attributes of the documents to be associated, and of the attributes of the documents belonging to said clusters; and iteratively merging the clusters obtained from the association step in conformance with the defined constraints.

These construction steps automatically cluster documents on the basis both of criteria that the user has defined and of distance criteria between document attributes, to obtain a restricted number of clusters in an efficient manner.

In one implementation of the invention, constraints are obtained by a step of using a user interface to select documents both for which a constraint must be associated and a type of constraint.

Thus users can simply define constraints between documents based on criteria specific to the users themselves and that can change over time.

In another implementation, the step of obtaining constraints is effected by reading predefined constraints in a memory space.

Thus predefined constraints can be taken into account, in particular during modification of a tree.

Following a user request to move a document from a first cluster at a first tree level to a second cluster at a second tree level, the method advantageously further includes the preliminary steps of:
  determining and selecting the higher level common cluster lowest in the tree;
  moving documents from subclusters lower in the tree into the determined cluster;
  deleting the portion of the tree lower than the determined cluster; and
  automatically creating new constraints taking account of the movement of said document and storing those new constraints for each tree level.

Similarly, following a user request to create a new subcluster for a given tree level and including at least one selected document from a second subcluster of the same level, the method further includes the following preliminary steps:
  determining and selecting the higher level common cluster lowest in the tree;
  moving documents from subclusters lower in the tree into the determined cluster;
  deleting the portion of the tree lower than the determined cluster; and
  automatically creating new constraints taking account of the creation of the new subcluster and storing those new constraints for each tree level.

Thus, for a modification requested by a user, the process restarts construction of the tree automatically, taking account of the new criteria of the modification.

Another aspect of the invention is directed to a device for assisting with the construction of a tree of clusters of electronic documents, which documents are defined by predetermined attributes, wherein the device includes:
  means for obtaining constraints defined between at least two documents of a given cluster at a given tree level;
  means for storing constraints from the constraint obtaining means;
  means for constructing subclusters as a function of constraints from the constraint obtaining means and attributes of the documents of the given cluster;
  means for creating a tree level corresponding to subclusters from the subcluster construction means; and
  means for selecting a subcluster from the subcluster construction means.

In one particular embodiment, the means for obtaining constraints include user interface means that include display means in which the user can select icons representing the constraints to be obtained.

In another particular embodiment, the means for obtaining constraints include means for reading constraints saved in a memory space.

The device has the same advantages as the method that it implements.

Another aspect of the invention provides a multimedia electronic device including means for storing multimedia documents, the device being characterized in that it includes means for implementing the above method of assisting with the construction of a tree of clusters of electronic documents.

Another aspect of the invention provides a computer program including program instructions adapted to execute the above method of assisting with the construction of a tree of clusters of electronic documents when said program is loaded into and executed in a data processing system.

Another aspect of the invention is directed to computer-readable storage means, where applicable totally or partially removable, storing a set of instructions that can be executed by said computer to execute the method of the invention for assisting with the construction of a tree of a cluster of electronic documents. the invention for assisting with the construction of a tree of a cluster of electronic documents.

BRIEF DESCRIPTION OF THE DRAWINGS

Other features and advantages of the invention become more clearly apparent on reading the following description, which is given by way of nonlimiting example only, and with reference to the appended drawings, in which.

DETAILED DESCRPITON OF THE DRAWINGS

Figure 1:
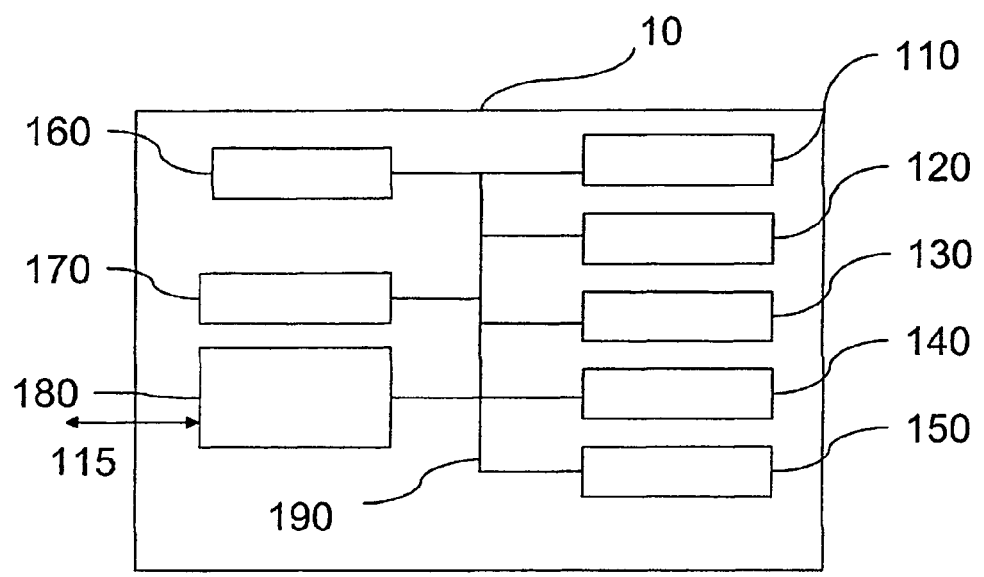
FIG. 1 represents one embodiment of a device of the invention.

FIG. 1 is a block diagram of one embodiment of a device of the invention for assisting with the construction of a tree of clusters of documents. The device is a microcomputer 10, for example, and has a communication bus 190 to which are connected a central processor unit 110, a read-only memory 120, a random-access memory (RAM) 130, a screen 140, a keyboard 150, an interface 180 for communication with a communications network 115, a hard disk 170, and a drive 160 for reading and writing data on a removable medium.

The read-only memory 120 stores, among other things, the program executing the main steps of the method of the invention, which are described later with reference to FIGS. 3 and 4.

The read-only memory 120 also stores constraints associated with the documents and defined by users.

More generally, the program of the invention is stored in storage means that can be read by a computer or a microprocessor 110. The storage means are integrated into the device or not, and can be removable.

When the device is powered up, the program of the present invention is transferred into the random-access memory 130, which then contains the executable code of the invention and the data necessary to implement the invention.

The device of the invention has a screen for reproducing information representing the construction of the tree in accordance with the invention. The screen also displays a graphical user interface enabling users to determine documents with which a constraint must be associated.

Via the keyboard, or some other interface means such as a computer mouse, the user selects clusters of documents for which a tree is to be constructed, the documents with which a constraint must be associated, and the type of constraint.

The hard disk 170 stores documents classified by the method of the invention.

The hard disk can alternatively store the program executing the method of the invention described below with reference to FIGS. 3 and 4.

The drive 160 for reading and writing data on removable storage means is a CD or DVD drive, for example. Documents classified in accordance with the invention can also be saved on removable storage means such as a CD or a DVD.

The drive can read the program of the invention in order to transfer it onto the hard disk 170.

The classification of the documents and the tree of clusters of documents obtained using the invention are not necessarily linked to the physical organization of the documents in the storage system. The representation of the tree obtained using the invention can be a merely logical representation. Thus a plurality of logical representations can be obtained for a single physical organization.

Figure 2:
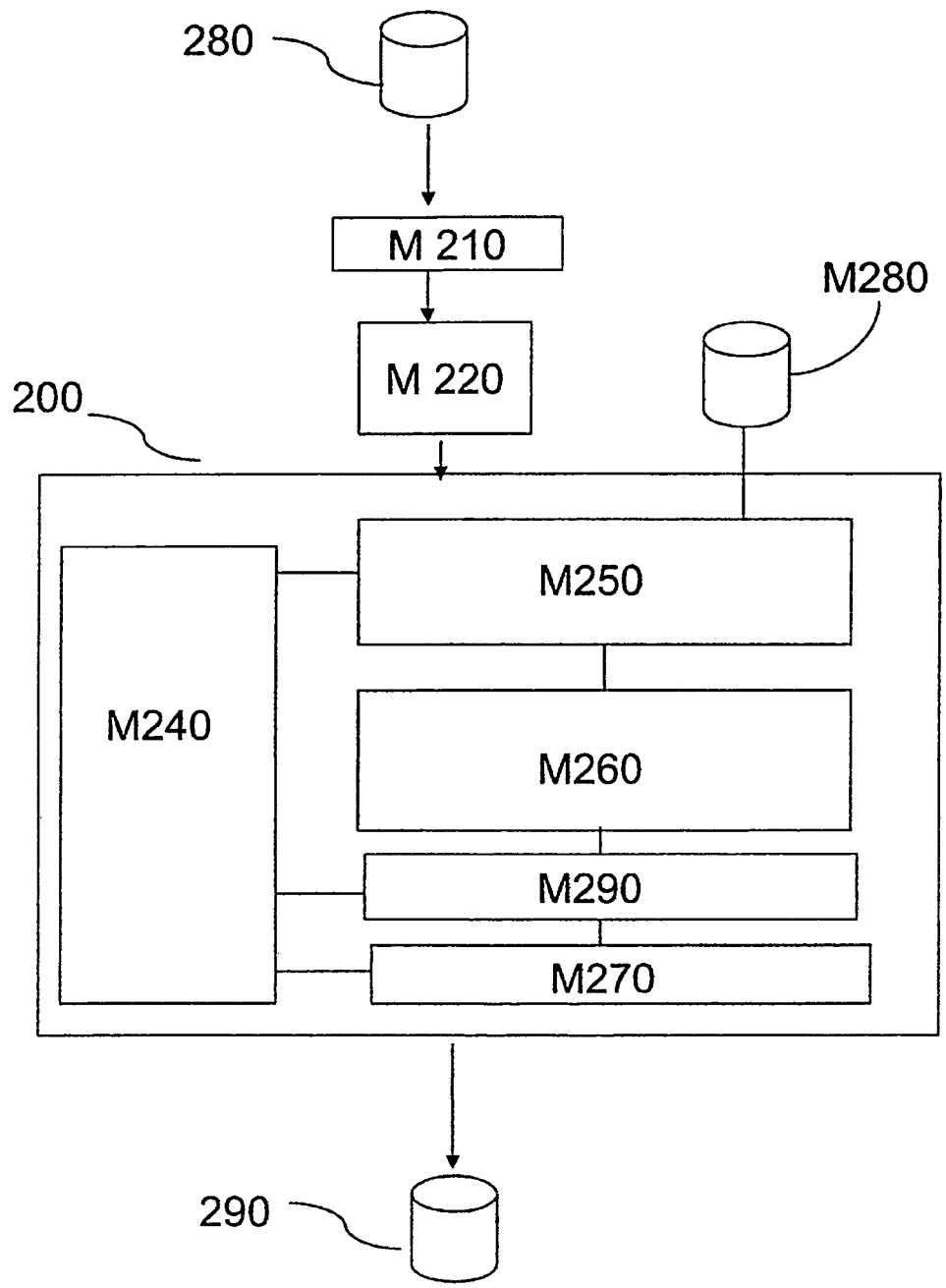
FIG. 2 represents the main components of the device of the invention.

FIG. 2 is a block diagram representing the main components of the device of the invention.

A vectorization module M210 processes documents from a storage base 280. It constructs for each document a digital vector describing that document. For an image, for example, this vector could represent a set of measurements, of functions applied to a bitmap representation of the image, for a text document, this vector could represent a calculation of predefined words for each document. Thus a vector represents attributes of the corresponding document. It is therefore possible to define a distance between two vectors and therefore a metric for the proximity the documents. The distance between two vectors represents the distance between the attributes of the documents.

A normalization module M210 normalizes the vectors representing the documents to obtain constant norm vectors. This normalization can be effected by scaling all descriptive variables in the range [0;1], for example.

Documents processed in this way by the modules M210 and M220 then reach the input of the device 200 of the invention for assisting with the construction of a document tree.

This device includes a user interface module M240 that enables a user to work interactively on the classification of documents and in particular to define constraints to be associated with documents to modify the tree constructed by the method of the invention.

The device also includes a module M250 for obtaining constraints defined between at least two documents of a cluster. Constraints can be obtained via the graphical interface module M240 or, for example, simply by reading predefined constraints stored in a memory space (M280) of the device. The new constraints are stored in a memory space M280 of the device.

The device includes a module M260 for constructing subclusters of documents as a function of the constraints obtained by the module M250 and attributes specific to the documents. It includes a module M290 for creating tree levels corresponding to subclusters constructed by the module M260. The module M290 is connected to the user interface module to display the tree obtained.

Finally, the device includes a module M270 for selecting a cluster or subcluster created by the module M260. A cluster or subcluster is selected by means of the user interface module. The selected cluster is then applied to the modules previously described of the device 200 in order to obtain at the output of the device a tree of clusters of documents satisfactory to the user.

A device of the invention can be integrated into multimedia electronic devices that include means for storing multimedia documents such as images, music files, text documents, etc., for example. For example, this device is a music file reader, which also includes a graphical interface, a pocket computer or electronic diary, or a mobile telephone with or without a camera.

Thus the method of the invention for assisting with the construction of a tree, which is of low complexity, can be executed on this type of device to classify stored multimedia contents.

The main steps of the method of the invention for assisting with the construction of a tree of clusters of documents are described below with reference to FIG. 3.

Starting with a selected cluster of documents D at a given tree level, a step E300 is executed to obtain constraints between at least two documents of the cluster. For example, in this step, the user selects two documents and a graphical interface icon representing a "Must-Link" (ML) constraint or a "Cannot-Link" (CL) constraint. An example of a graphical user interface for obtaining constraints is described below with reference to FIG. 7.

The ML constraint expresses the intention to put the two documents in the same cluster at the lower level (subcluster) and the CL constraint expresses the intention not to put the two documents in the same cluster at the lower level.

Thus a constraint is defined by a pair of documents, a constraint type (ML or CL), and a tree level.

Constraints defined in this way are stored in a memory space of the device.

Constraints can also be obtained in the step E300 simply by reading constraints previously stored in a memory space.

Constraints can also be obtained by the user selecting a certain number of documents that they wish to associate in the same subcluster. The user can thus "sketch" a subcluster. Constraints are then created automatically in the step E300, all documents representative of subclusters being associated two by two (all possible pairs of two different documents) by CL constraints.

The constraints defined in this way in the step E300 are then used to construct subclusters in the step E310. The construction of the subclusters is also a function of the attributes of the documents. The subcluster construction step is described in detail later with reference to FIGS. 4 and 5.

Figure 6A:
FIG. 6a shows one tree level and constraints associated with documents belonging to a cluster at this level.
Figure 6B:
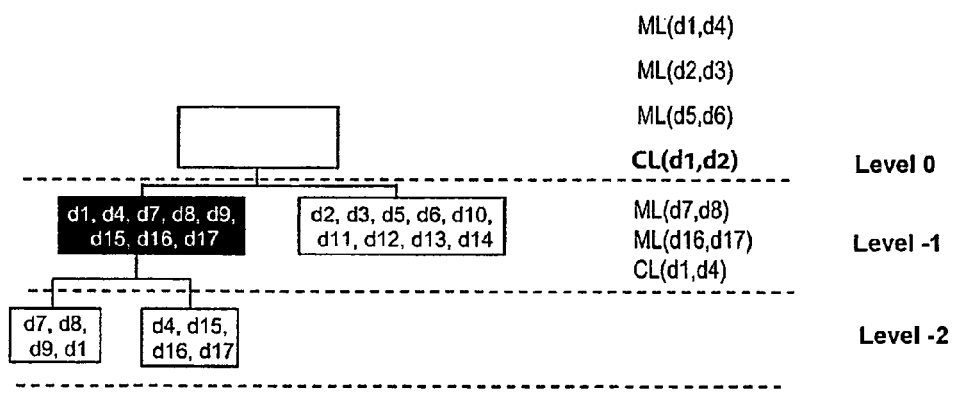
FIG. 6b shows two other tree levels, the clusters of documents and their associated constraints, following execution of a method of the invention.

The step E310 is followed by the step E320 in which a new tree level corresponding to the subclusters created in this way is created. FIGS. 6a and 6b represent the tree being created.

In the step E330, the user can halt the creation of the tree if the user considers that it is satisfactory. If so (Y), the method ends. Otherwise (N), the step E320 is followed by the step E340 in which a subcluster previously created at the lower level of the tree is selected. This selection can be effected by the user via the graphical interface.

It can also be offered automatically to the user depending on a criterion, for example selection of the subcluster with the most members or the subcluster containing the latest image selected.

The step E340 is followed by the step E300 described above. The steps E300, E310, E320, E330, and E340 are thus iterated for the selected subcluster until a tree satisfactory to the user is obtained.

Figure 3:
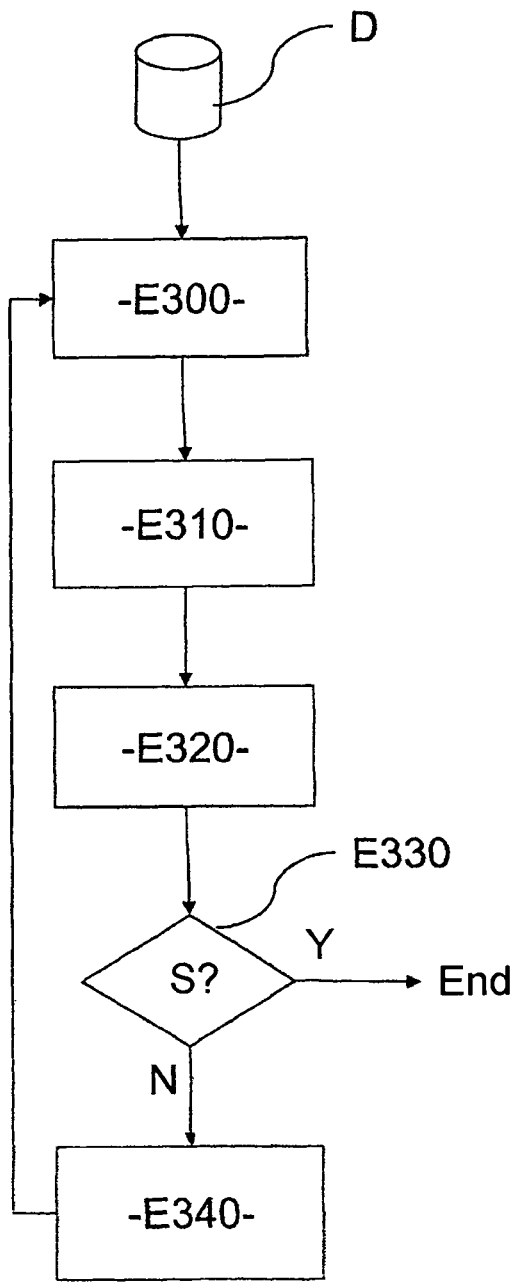
FIG. 3 is a flowchart showing the main steps of a method of the invention for assisting with the construction of a tree of a cluster of documents.
Figure 4:
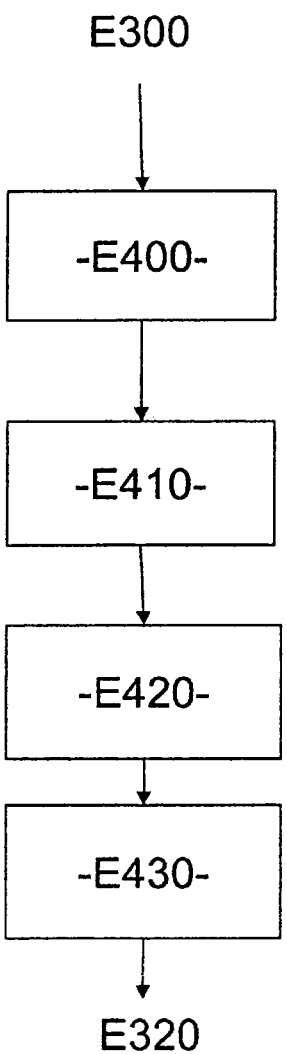
FIG. 4 is a flowchart showing in detail the step of the invention of constructing subclusters.

FIG. 4 shows in detail the step E310 described with reference to FIG. 3. The step E400 creates a cluster for each document participating in at least one constraint based on the constraints obtained in the step E300.

Figure 5:
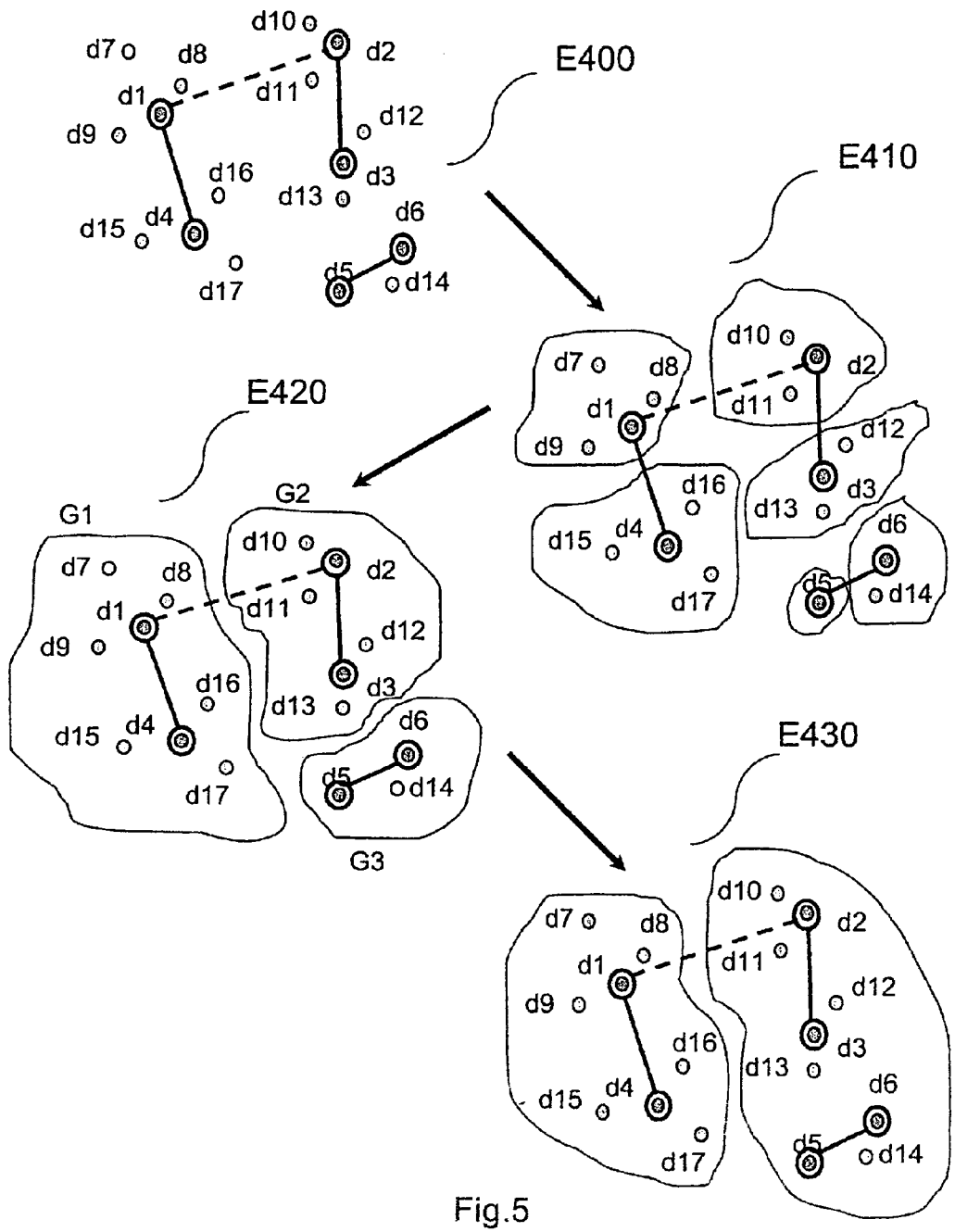
FIG. 5 is a diagram showing the steps of the invention executed during construction of subclusters.

This step E400 is shown in FIG. 5, in which the documents are represented by solid circles, ML constraints by solid lines, and CL constraints by dashed lines. At this stage, a cluster comprises only one document (a kernel). The step E400 is followed by the step E410 in which documents not participating in at least one constraint are associated with the clusters created in the step E400.

This association is effected according to a criterion of the distance between the attributes of the documents to be associated and those of the documents belonging to the clusters. Thus the distance of a document from a newly created cluster is defined as the distance between the document and the kernel of the cluster (at this stage, each cluster has a single kernel). The criterion for associating a document with a cluster is a shortest distance criterion.

As mentioned above with reference to FIG. 2, the distance between attributes of documents is obtained by measuring the distance between vectors representing the attributes of the documents.

Thus, after the step E410, clusters are obtained as indicated for the step E410 in FIG. 5.

The step E410 is followed by the step E420 of iterative merging of some clusters obtained in the previous step, as a function of the constraints associated with the documents. Thus if a cluster contains a document d1 participating in an ML constraint with a document d4 of another cluster, the two clusters are merged automatically. This is shown under the reference E420 in FIG. 5.

In that figure, it is clear that the clusters in which d2 and d3 participate in an ML constraint have been merged. The same applies to the clusters including the documents d5 and d6. FIG. 5 shows the construction of three clusters G1, G2, and G4 at this stage.

The step E420 is followed by the step E430.

In the step E430, as shown in FIG. 5, clusters are merged so that if a cluster G2 and a cluster G3 do not include a respective document for which a CL constraint exists, then G2 and G3 are merged. The subclusters shown under the reference E430 in FIG. 5 are then obtained.

In each step of merging clusters described above, if more than one merge is possible, priority is given to merging the two clusters for which merging is possible that are nearest each other, the distance between the two clusters being defined by the shortest distance between one of the kernels of the first cluster and one of the kernels of the second cluster (after the first mergers, each subcluster has one or more kernels), for example.

The step E430 is followed by the step E320 described above with reference to FIG. 3.

FIGS. 6a and 6b show the construction of clusters of documents of the tree with the constraints associated with each level of the tree. For example, FIG. 6a shows a cluster of documents that correspond to the document shown in FIG. 5 under the reference E400. Constraints on certain of these documents have been defined and stored and are represented in FIG. 6a. They remain associated with the corresponding level, which here is the level 0.

FIG. 6b shows the creation of two tree levels. The first level created (level −1) corresponds to the subclusters obtained after the step E430 described with reference to FIG. 5. The creation of this tree level corresponds to the step E320 described with reference to FIG. 3.

The selection of a cluster of documents corresponding to the step E340 in FIG. 3 is represented white on black in FIG. 6b. According to the method of the invention described with reference to FIG. 3, the steps E300, E310, E320 are executed again. New constraints corresponding to the level −1 are therefore defined, and are represented in FIG. 6b, new subclusters are created, and a new tree level (level −2) is created, and is represented in FIG. 6b.

Figure 7:
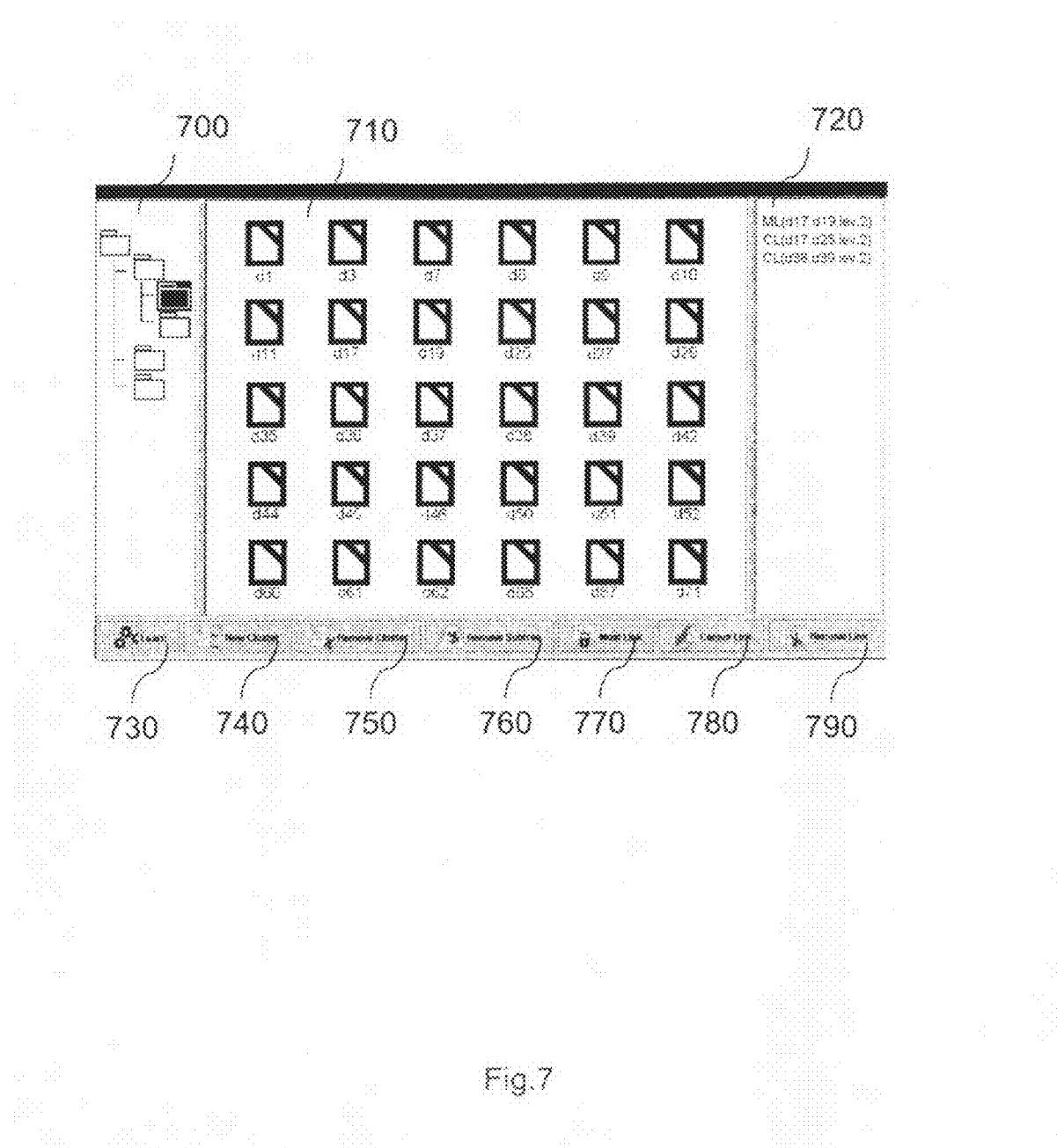
FIG. 7 shows one example of a user graphical interface.

FIG. 7 shows an example of a graphical user interface. A document cluster in the tree represented in the window 700 is selected. The selection cluster is represented white on black. The documents of the selected cluster are displayed in a second window 710. The user can then select two documents, for example the documents d17 and d19, and then select the icon representing the constraint to be associated with those documents, for example the icon 770 corresponding to the ML constraint. A constraint associated with level −2 of the tree is then created and displayed in the third display window 720. The CL constraint can be selected by means of the corresponding icon 770. Once the constraints of the selected cluster have been defined, the user can select the "learn" icon 730 to execute the step E310 of the method represented in FIG. 3.

When a tree has been partially constructed by the method of the invention, it can be modified at any time using the same method. For example, if the user wishes to delete a portion of the tree, they select a document cluster of the tree using the FIG. 7 graphical interface, for example. They then click on the icon 760 to delete all of the lower part of the tree. This action shifts documents from the clusters of the deleted tree part into the selected cluster. All constraints linked to documents are also deleted for the lower levels of the tree.

Thus the method of assisting with the construction of a tree described with reference to FIG. 3 can be used again, starting with the selected cluster.

Figure 8A:
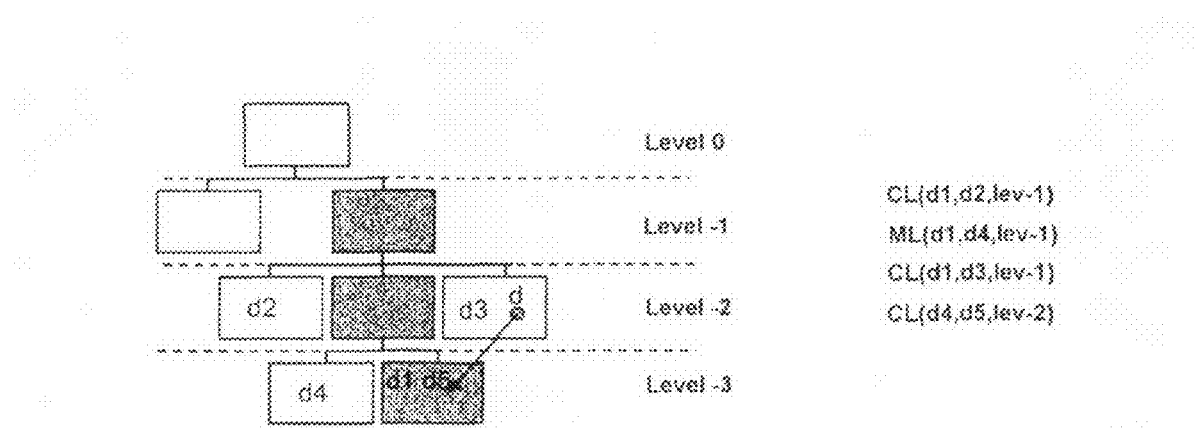
FIGS. 8a, 8b, 8c, and 8d constitute a tree diagram showing the steps of the invention executed to move a document in the tree.

The steps carried out when modifying the tree as a result of the user wishing to move a document from a first cluster of the tree to a second cluster of the tree are described below with reference to FIGS. 8a, 8b, 8c, and 8d. As shown in FIG. 8a, the user wishes to move the document d from a cluster at tree level −2 to a cluster at level −3. To do this, the user uses the mouse to drag the icon representing the document to be moved, once selected in the window 710 of the graphical interface from FIG. 7, from the first cluster of documents to the second cluster, for example.

As shown in FIG. 8a, the constraints for each tree level are saved in memory.

The method of constructing a different tree begins by determining and selecting the higher level common cluster that is lowest in the tree, i.e. the first cluster common to the initial cluster of the data d and the destination cluster of the movement encountered on moving up the tree from the two clusters concerned toward higher levels. All the portion of the tree below the selected cluster is deleted. As mentioned above in connection with deleting a portion of the tree, all documents from clusters of the deleted portion are moved into the selected cluster. In contrast, in this instance, lower level constraints that relate to documents other than the one to be moved are retained in memory. New constraints are defined to take account of the movement of the document d.

Figure 8B:
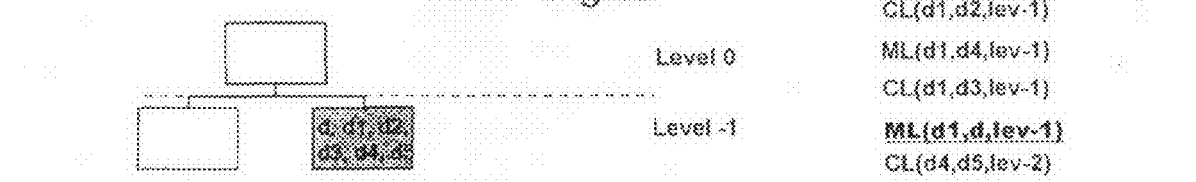
Figure 8C:
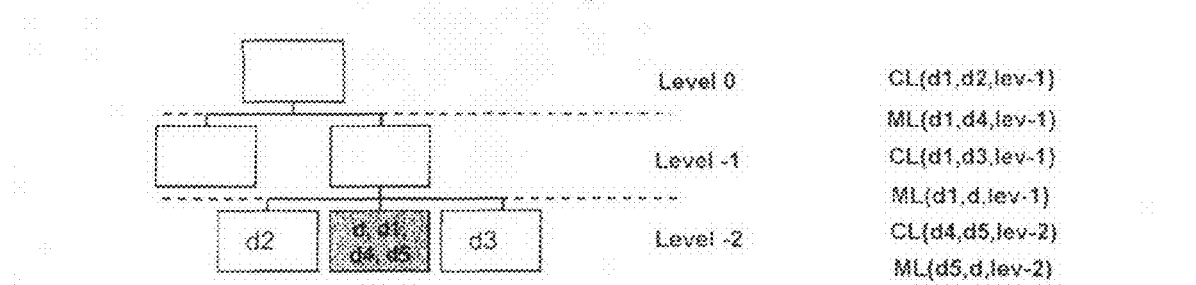

Accordingly, the constraints underlined in FIG. 8b are created automatically. They express the fact that, at level −1, the document d and the kernel document d1 must be linked ("Must Link" (ML) constraint) to force d into the subcluster of d1 at the level −2 (FIG. 8c). The same applies to the document d and the kernel document d5 at the level −2.

Figure 8D:
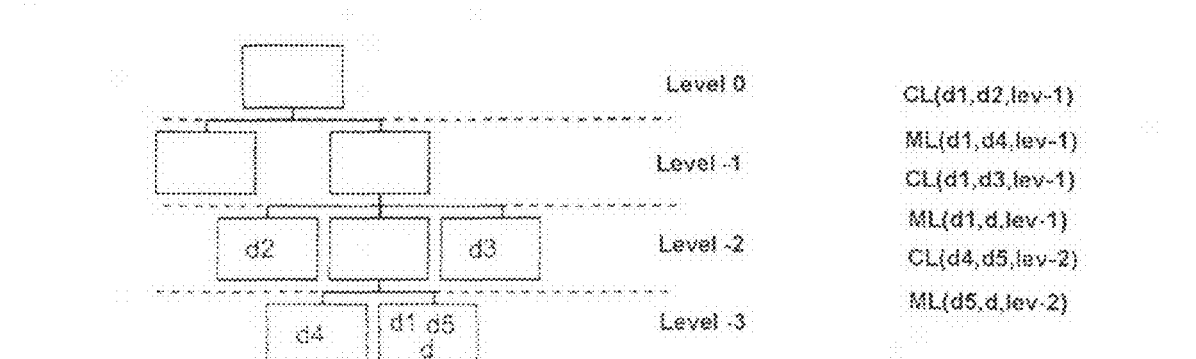

Thus the method of constructing a tree described with reference to FIG. 3 is executed on the basis of the selected common higher cluster and using the constraints already defined and saved in memory. Following application of this method, a tree as shown in FIG. 8d is obtained, in which the document d has been moved into the required cluster. Certain documents close to the moved document d that do not participate in constraints and that were in the same first cluster as d will automatically take the same path as the document d and end up in the same destination cluster.

Figure 9A:
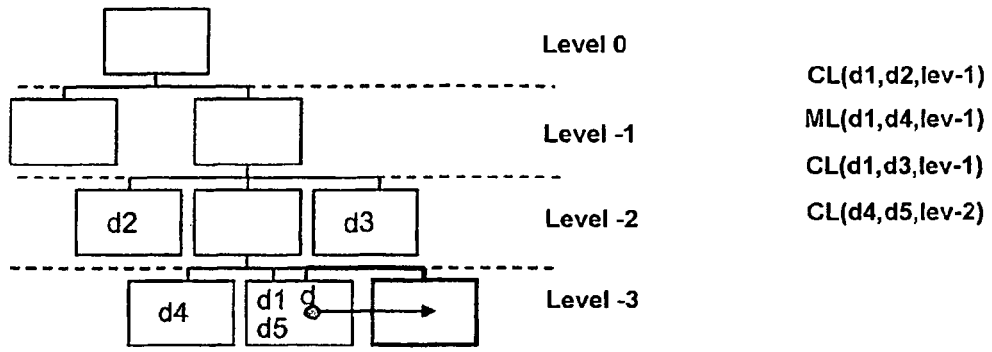
FIGS. 9a, 9b, and 9c show the steps of the invention executed to create another cluster of documents in the tree.
Figure 9B:
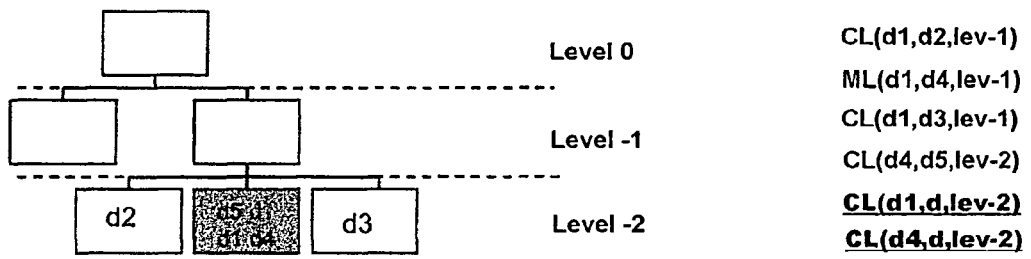
Figure 9C:
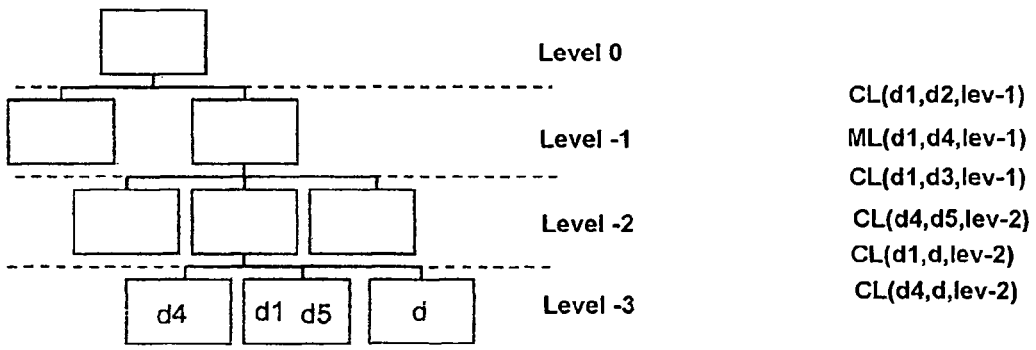

The steps executed when reconstructing a tree following a cluster creation type modification initiated by the user are described below with reference to FIGS. 9a, 9b, and 9c. As shown in FIG. 9a, the user wishes to create a new cluster containing the document d, at the same level as the cluster initially containing the document d. To do this, the user selects a document in the window 710 of the graphical interface represented in FIG. 7 and clicks on the cluster creation icon 740. A step of determining and selecting the higher cluster in the tree is executed. As in the modifications described above, the portion of the tree below the selected cluster is deleted and documents from clusters in that portion of the tree are included in the selected cluster. The new CL constraints underlined in FIG. 9b are created and specify that the document d must be separated from the kernel documents d1 and d4 at the level −2. Since d can no longer join any of the subclusters, a new subcluster is created automatically during the phase of constructing the tree described with reference to FIG. 3. Note that, to prevent d from being able to join the subcluster containing the kernels d1 and d5 at the level −2, the new constraint CL(d1,d) is created at the level −1. The constraint CL(d5,d) could have served this function equally well. If there is more than one possible kernel for creating a new link CL in order to prevent a document from joining a subcluster, the kernel farthest from that document is chosen (in this example, it is therefore assumed that d5 is closer to d than d1 and d1 is therefore chosen for the link CL(d1,d) created).

The method of constructing a tree described with reference to FIG. 3 is therefore executed, starting from the selected higher cluster and with the new constraints defined and saved in memory. Following execution of this method, a tree as shown in FIG. 9c is obtained, in which a new cluster has been created automatically, containing the document d and where applicable documents sufficiently close to d (which were assigned to this new subcluster during the construction of the tree as described with reference to FIG. 3).

Other modifications can be made to the tree, for example deleting a selected cluster. Under such circumstances, the portion of the tree below that cluster is deleted and documents from clusters of that portion and from the deleted cluster are moved into the cluster at a higher level in the tree. The constraints associated with the documents of those clusters are also deleted. The method of constructing the tree described with reference to FIG. 3 is then executed starting from this higher level cluster.

Thus users can manage files in the same way as usual, and with the assistance of an automatic method of constructing a tree, via the automatic or manual definition of ML and CL links between a small number of documents. This saves the user a lot of time and the result obtained proves more satisfactory.

The invention claimed is:

1. A method of assisting with the construction of a tree of clusters of electronic documents, which documents are defined by predetermined attributes, wherein the method comprises, for a given cluster of documents and a given level of the tree, the steps of:
   a) obtaining and storing constraints defined by a user between at least two documents of said cluster, each of said constraints specifying a linking relationship between at least a first document and at least a second document of said cluster, said linking relationship indicating whether the first document and the second document must be or cannot be included in a same subcluster;
   b) constructing subclusters as a function of the constraints obtained and the attributes of the documents of said cluster, said subclusters comprising all the documents of said cluster;
   c) creating a tree level corresponding to the constructed subclusters; and
   d) selecting a constructed subcluster and iterating the steps a), b), c), and d) for the selected subcluster to obtain said tree.

2. The method according to claim 1, wherein the subcluster construction step includes the following steps:
   creating a subcluster for each document participating in at least one constraint;
   associating documents not participating in any constraint with the subclusters created in this way according to a criterion calculated on the basis both of the attributes of the documents to be associated, and of the attributes of the documents belonging to said clusters; and
   iteratively merging the subclusters obtained from the association step in conformance with the defined constraints.

3. The method according to claim 1, wherein constraints are obtained by a step of using a user interface selecting both documents for which a constraint must be associated and a type of constraint.

4. The method according to claim 1, wherein the step of obtaining constraints is effected by reading predefined constraints in a memory space.

5. The method according to claim 1, wherein following a user request to move a document from a first cluster at a first tree level to a second cluster at a second tree level, the method further comprises the preliminary steps of:
   determining and selecting the higher level common cluster lowest in the tree;
   moving documents from subclusters lower in the tree into the determined cluster;
   deleting the portion of the tree lower than the determined cluster; and
   automatically creating new constraints taking account of the movement of said document and storing those new constraints for each tree level.

6. The method according to claim 1, wherein following a user request to create a new subcluster for a given tree level and including at least one selected document from a second subcluster of the same level, the method further comprises the following preliminary steps:
   determining and selecting the higher level common cluster lowest in the tree;
   moving the documents from subclusters lower in the tree into the determined cluster;

deleting the portion of the tree lower than the determined cluster; and automatically creating new constraints taking account of the creation of the new subcluster and storing those new constraints for each tree level.

7. A device for assisting with the construction of a tree of clusters of electronic documents, which documents are defined by predetermined attributes, wherein the device comprises:

means for obtaining defined constraints defined by a user between at least two documents of a given cluster at a given tree level;

means for storing constraints from the constraint obtaining means, each of said constraints specifying a linking relationship between at least a first document and at least a second document of said cluster, said linking relationship indicating whether the first document and the second document must be or cannot be included in a same subcluster;

means for constructing subclusters as a function of constraints from the constraint obtaining means and attributes of the documents of the given cluster, said subclusters comprising all the documents of said cluster;

means for creating a tree level corresponding to subclusters from the subcluster construction means; and means for selecting a subcluster from the subcluster construction means.

8. The device according to claim 7, wherein the means for obtaining constraints include user interface means.

9. The device according to claim 8, wherein the user interface means include display means in which the user can select icons representing the constraints to be obtained.

10. The device according to claim 7, wherein the means for obtaining constraints include means for reading constraints saved in a memory space.

11. A multimedia electronic device including means for storing multimedia documents, wherein the device comprises means for implementing the method according to claim 1, for assisting with the construction of a tree of clusters of electronic documents.

12. A non-transitory computer readable medium storing a computer program including program instructions adapted to execute a method according to claim 1, for assisting with the construction of a tree of clusters of electronic documents when said program is loaded into and executed in a data processing system.

13. The method according to claim 1, wherein said subclusters are constructed so that:

the first document and the second document are included in a same subcluster if the first document and the second document have a linking relationship indicating that the first document and the second document must be included in a same subcluster, and the first document and the second document are not included in the same subcluster if the first document and the second document have a linking relationship indicating that the first document and the second document cannot be included in a same subcluster.

14. The method according to claim 1, wherein the number of subclusters constructed for a given cluster depends on the constraints obtained.

* * * * *